United States Patent
Xu et al.

(10) Patent No.: US 9,743,332 B2
(45) Date of Patent: Aug. 22, 2017

(54) METHOD OF AUTOMATICALLY ADJUSTING MOBILITY PARAMETER

(71) Applicant: Samsung Electronics Co., Ltd., Gyeonggi-do (KR)

(72) Inventors: Lixiang Xu, Beijing (CN); Gert Jan Van Lieshout, Middlesex (GB); Hong Wang, Beijing (CN)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 178 days.

(21) Appl. No.: 14/440,332

(22) PCT Filed: Nov. 1, 2013

(86) PCT No.: PCT/KR2013/009851
§ 371 (c)(1),
(2) Date: May 1, 2015

(87) PCT Pub. No.: WO2014/069938
PCT Pub. Date: May 8, 2014

(65) Prior Publication Data
US 2015/0304931 A1    Oct. 22, 2015

(30) Foreign Application Priority Data
Nov. 2, 2012    (CN) .......................... 2012 1 0434333

(51) Int. Cl.
*H04W 4/00* (2009.01)
*H04W 36/32* (2009.01)
*H04W 36/00* (2009.01)

(52) U.S. Cl.
CPC ....... *H04W 36/32* (2013.01); *H04W 36/0033* (2013.01); *H04W 36/0083* (2013.01)

(58) Field of Classification Search
CPC ......... H04W 36/0005; H04W 36/0011; H04W 36/32; H04W 36/34; H04W 36/36; H04W 36/38; H04W 36/385; H04W 36/0083; H04W 36/0088; H04W 36/0033; H04W 36/0044
See application file for complete search history.

(56) References Cited

U.S. PATENT DOCUMENTS

| 8,649,323 | B2* | 2/2014 | Iwamura | H04W 92/045 370/328 |
| 9,319,941 | B2* | 4/2016 | Bonneville | H04W 36/0005 |
| 2009/0046573 | A1* | 2/2009 | Damnjanovic | H04W 36/30 370/216 |
| 2010/0118781 | A1* | 5/2010 | Petrovic | H04L 1/1887 370/328 |

(Continued)

OTHER PUBLICATIONS

International Search Report dated Mar. 3, 2014 in connection with International Patent Application No. PCT/KR2013/009851, 3 pages.

(Continued)

*Primary Examiner* — Kevin Mew

(57) ABSTRACT

By the method of the present invention, the automatic adjustment of mobility parameter between different frequencies or different access systems becomes available and can be supported in the case of the self-optimization of mobile load balance and the self-optimization of mobile robustness, so as to improve the performance of mobile communication system.

18 Claims, 8 Drawing Sheets

(56) References Cited

U.S. PATENT DOCUMENTS

| | | | | |
|---|---|---|---|---|
| 2011/0237258 A1* | 9/2011 | Nylander | ............. | H04J 11/0093 455/437 |
| 2011/0269465 A1* | 11/2011 | Xu | .................... | H04W 36/0033 455/436 |
| 2012/0100860 A1* | 4/2012 | Lei | ........................ | H04W 36/20 455/438 |
| 2012/0165023 A1* | 6/2012 | Park | .................. | H04W 36/0072 455/438 |
| 2012/0327810 A1* | 12/2012 | Wang | ................ | H04W 36/0083 370/254 |
| 2013/0012249 A1* | 1/2013 | Centonza | .......... | H04W 72/0426 455/501 |
| 2013/0045740 A1* | 2/2013 | Gayde | .................. | H04W 48/06 455/436 |
| 2013/0078989 A1* | 3/2013 | Kubota | ................. | H04W 48/12 455/422.1 |
| 2013/0084864 A1* | 4/2013 | Agrawal | ........... | H04W 36/0083 455/436 |
| 2013/0189971 A1* | 7/2013 | Callender | ......... | H04W 36/0094 455/423 |
| 2014/0287762 A1* | 9/2014 | Park | ....................... | H04W 36/32 455/441 |
| 2014/0334353 A1* | 11/2014 | Wei | ................... | H04W 72/1263 370/280 |
| 2015/0349908 A1* | 12/2015 | Centonza | .......... | H04W 72/1252 370/329 |

OTHER PUBLICATIONS

Written Opinion of International Searching Authority dated Mar. 3, 2014 in connection with International Patent Application No. PCT/KR2013/009851, 3 pages.

Huawei, "Handover Parameter Exchange", 3GPP TSG-RAN WG3 Meeting #65bis, Miyazaki, Japan, Oct. 12-15, 2009, 4 pages.

Orange, et al., "Self-Optimization Use Case: Self-Tuning of Handover Parameters", 3GPP TSG-RAN WGD #55bis, Malta, Mar. 27-30, 2007, 6 pages.

* cited by examiner

METHOD OF AUTOMATICALLY ADJUSTING MOBILITY PARAMETER

CROSS-REFERENCE TO RELATED APPLICATION(S)

The present application claims priority under 35 U.S.C. §365 to International Patent Application No. PCT/KR2013/009851 filed Nov. 1, 2013, entitled "METHOD OF AUTOMATICALLY ADJUSTING MOBILITY PARAMETER", and, through International Patent Application No. PCT/KR2013/009851, to Chinese Application No. 201210434333.6 filed Nov. 2, 2012, each of which are incorporated herein by reference into the present disclosure as if fully set forth herein.

TECHNICAL FIELD

The present invention relates to the field of mobile communication system, and more particularly to a method automatically adjusting a mobility parameter.

BACKGROUND ART

With the development of communication technologies, a mobile communication system has been evolved into a System Architecture Evolution (SAE) system. FIG. 1 is a schematic diagram illustrating the structure of a conventional SAE system. As shown in FIG. 1, the SAE system includes an Evolved Universal Terrestrial Radio Access Network (E-UTRAN) 101 and a core network at least including a Mobile Management Entity (MME) 105 and a Subscriber Gateway (S-GW) 106. The E-UTRAN 101 is configured to connect User Equipment (UE) to the core network and includes at least one evolved Node B (eNB) 102 and at least one Home eNB (HeNB) 103. The E-UTRAN 101 may further include a HeNB GW 104. The functions of the MME 105 and the S-GW 106 may be implemented by one module or implemented separately. eNBs 102 are connected to each other through an X2 interface, and each eNB102 is connected to the MME 105 and the S-GW 106 respectively through an S1 interface. The HeNB 103 is directly connected to the MME 105 and the S-GW 106 respectively through the S1 interface, or the HeNB 103 is connected to the HeNB GW 104 through the S1 interface, and then the HeNB GW 104 is connected to the MME 105 and the S-GW 106 respectively through the S1 interface.

In the early phase of establishing the SAE system or during the operation of the SAE system, a mass of human and material resources are needed to configure and optimize parameters of the SAE system, especially radio parameters, so as to guarantee that the SAE system has satisfying coverage, capacity, mobile robustness, mobile load balance and access speed of UE. In order to save the human and material resources during the operation of the SAE system, a self-optimization method of the SAE system is provided. In a self-optimization process, the configuration of eNB or HeNB is self-optimized according to a current state of the SAE system. Hereinafter, the eNB and the HeNB are called an eNB collectively, and the self-optimization method of the SAE system is illustrated.

FIG. 2 is a schematic diagram illustrating a principle of self-optimizing the SAE system. As shown in FIG. 2, after the eNB is powered or accesses the SAE system, the eNB performs self-configuration. The self-configuration process includes basic configuration and initial radio parameter configuration of the eNB. The basic configuration of the eNB includes configuring an IP address of the eNB, checking Operation, Maintenance and Management (OA&M), verification between the eNB and the core network, detecting a HeNB GW to which the eNB belongs if the eNB is a HeNB, and downloading software and operation parameters of the eNB to configure the eNB. The initial radio parameter configuration is implemented according to experiences and simulation. Because the performance of each eNB in the SAE system may be influenced by the environment of a region where the eNB is located, the eNB needs to perform initial configuration of adjacent cell list and initial configuration of load balance according to the initial radio parameter configuration of the region where the eNB is located. After the self-configuration process, many parameters configured by the eNB are not optimal. In order to make the SAE system have better performance, the configuration of the eNB needs to be optimized or adjusted, which is called self-optimization of mobile communication system. The configuration of the eNB may be optimized and adjusted through controlling the eNB by background OA&M. there may be a standard interface between the OA&M and the eNB. The OA&M sends a to-be-optimized parameter to the eNB (which may be an eNB or a HeNB) through the interface, and then the eNB optimizes a self-configured parameter according to the to-be-optimized parameter. Of cause, the eNB may optimize the parameters by itself. That is, the eNB detects that its performance needs to be optimized, and then optimizes or adjusts its corresponding parameters. The optimizing or adjusting the configuration of the eNB includes the self-optimization of adjacent cell list, the self-optimization of coverage and capacity, self-optimization of mobile robustness, self-optimization of load balance and the self-optimization of Random Access Channel (RACH) parameter.

The basic principle of self-optimization of load balance includes: adjacent cells exchange load information with each other, a source cell hands over UE served by the source cell to an adjacent destination cell when load balance is needed, and then the destination cell performs access control. When load balance is needed, the source cell may request the destination cell to change handover or cell reselection parameters of the destination cell. The source cell sends the destination cell a relative change value to be triggered by handover. The relative change value to be triggered by handover is a specific shift value of a cell triggering a handover preparing process. The destination cell accepts the request of the source cell, and the source cell considers a response value before the UE served by the source cell is handed over.

The conventional method may be applied to the handover between intra-frequency cells in a Long Term Evolution (LTE) system. However, if the above method is applied to the handover between inter-frequency cells in the LTE system or the handover between cells of different access systems, some problems will be caused.

A first problem is described as follows. For mobility between different frequencies or different Radio Access Technologies (RATs), there are no cell specific handover or cell reselection parameters. If the source cell changes mobile parameters for handing over to a certain frequency or RAT, mobile parameters to all neighbor cells that works on the frequency or RAT are influenced. However, a method for processing this case has not been provided in the prior art.

A second problem is described as follows. The handover or measurement mechanism between different frequencies or different access systems is different from the handover between intra-frequency cells in the LTE system. After a destination eNB receives a change request parameter from the source cell, the destination eNB does not know what is requested to be changed. If the destination eNB does not know which parameter is requested to be changed, the destination eNB does not know how to operate and may adopt a contrary operation. In this way, not only the automatic adjustment of mobile parameter cannot achieve an effect, but also a contrary function may occur, which makes system performance worse.

DISCLOSURE OF INVENTION

Technical Problem

The present invention intends to find a method to solve the above problems, so as to make the automatic adjustment of mobile parameters between different frequencies or different access systems available, and improve the system performance.

Solution to Problem

Embodiments of the present disclosure provide a method of automatically adjusting a mobility parameter, comprising: sending, by an evolved Node B (eNB) 1, an eNB 2 a message containing a threshold of mobility parameter of a cell located in the eNB1 which is adjusted and a relative adjustment value of the threshold; and determining, by an eNB2, a handover triggering parameter of the cell located in the eNB2 according to adjustment of the cell located in the eNB1.

Embodiments of the present disclosure provide a method of automatically adjusting a mobile parameter, comprising: sending, by an evolved Node B (eNB) 1, a message to an eNB2 to request the eNB2 to adjust a mobility parameter of a cell located in the eNB2, wherein the message contains a threshold requested to be adjusted and a relative adjustment value corresponding to the threshold, and further contains an threshold of a mobile parameter adjusted in a cell located in the eNB1 and a relative adjustment value corresponding to the threshold; and sending, by the eNB2, a response message to the eNB1.

Advantageous Effects of Invention

Accordingly present invention, a mobility parameter can be automatically adjusted efficiently.

MODE FOR THE INVENTION

In order to make the object, technical solution and merits of the present invention clearer, the present invention will be illustrated in detail hereinafter with reference to the accompanying drawings and specific examples.

Figure 1:
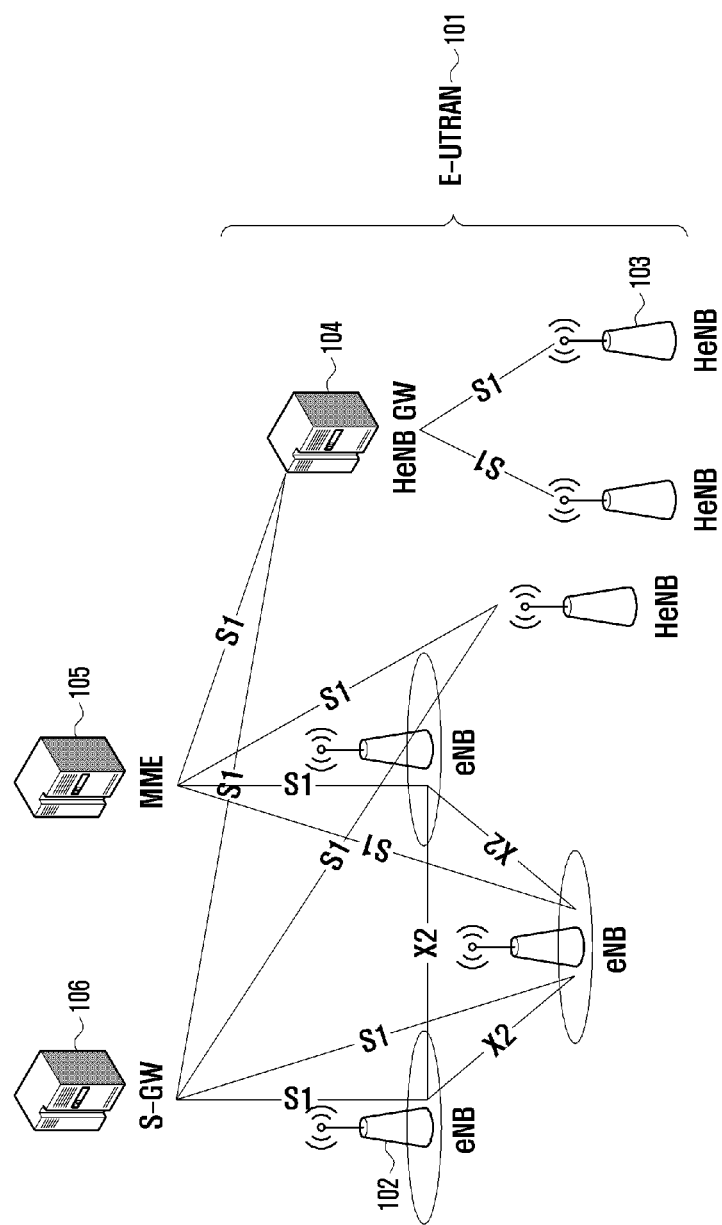
FIG. 1 is a schematic diagram illustrating the structure of a conventional SAE system.
Figure 2:
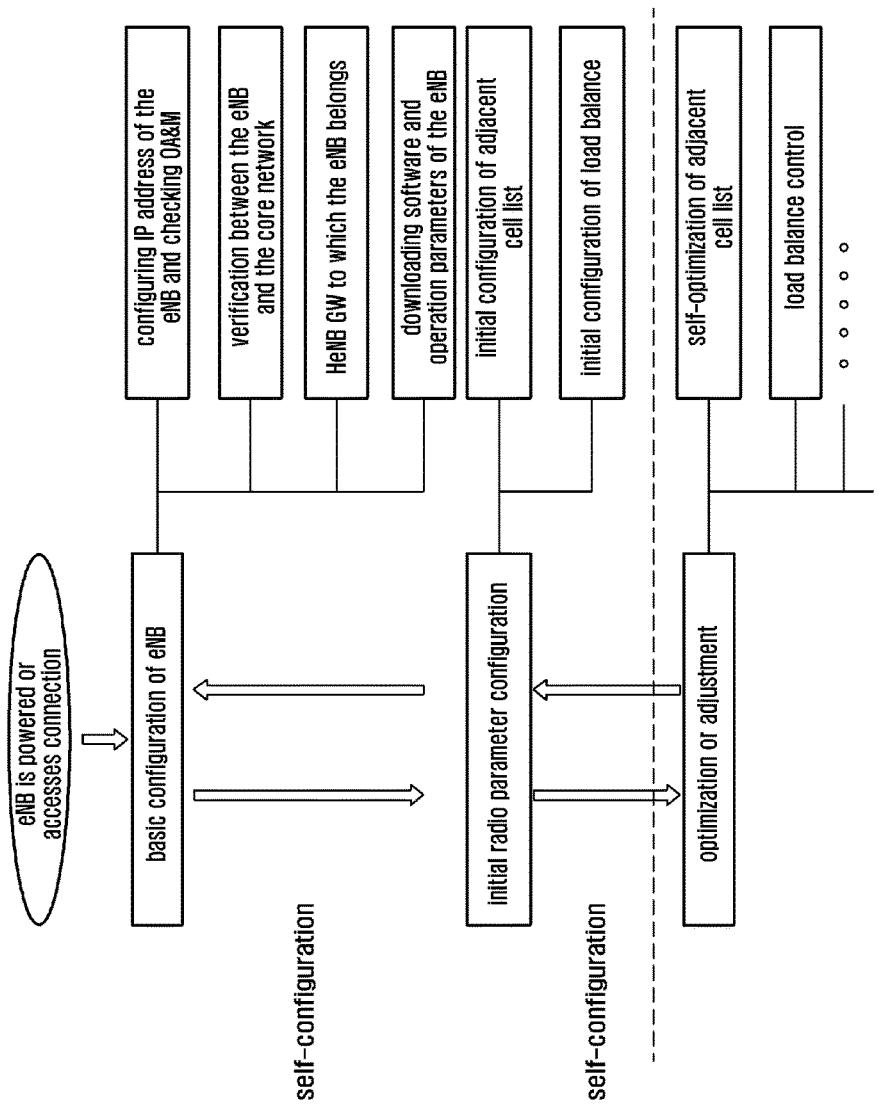
FIG. 2 is a schematic diagram illustrating a principle of self-optimizing the SAE system.
Figure 3:
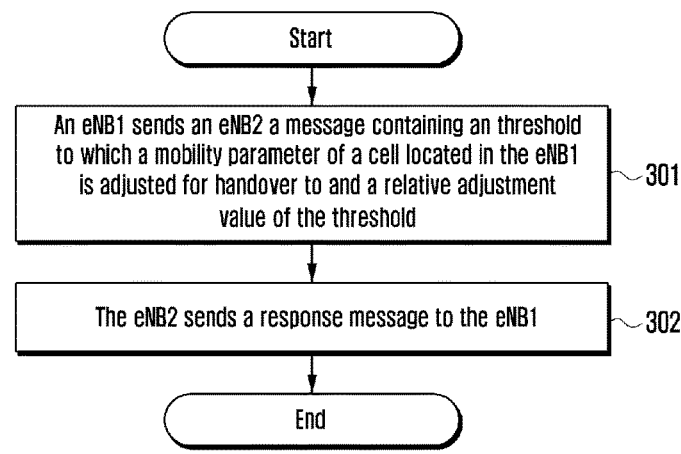
FIG. 3 is a schematic flowchart illustrating a first method of automatically adjusting a mobility parameter according to the present invention.

FIG. 3 is a schematic flowchart illustrating a first method of automatically adjusting a mobility parameter according to the present invention. As shown in FIG. 3, the method includes following blocks.

In block 301, an eNB1 sends an eNB2 a message containing a threshold of a mobility parameter of a cell located in the eNB1 which is adjusted and a relative adjustment value of the threshold.

The threshold of the mobility parameter includes:
a threshold of the smallest quality level of destination frequency, and/or
a threshold of the largest quality level of source cell, and/or
a threshold of the smallest quality level of destination radio access system, and/or
a threshold of the largest quality level of source radio access system.

The message sent to the eNB2 by the eNB1 may contain a cell identity of the cell (a source cell) located in the eNB1. For a process of automatically adjusting the mobility parameter between different RATs, if the source cell is a LTE cell, the message further contains a Tracking Area Identity (TAI) of the source cell. If the source cell is a Universal Mobile Telecommunications System (UMTS) cell, the message further contains a Location Area Identity (LAI) and Routing Area Code (RAC) of the source cell, and may further contain a Radio Network Controller (RNC) ID of the source cell.

The message sent to the eNB2 by the eNB1 may further contain information about to which frequency the mobility parameter for handing over is adjusted by the cell located in the eNB1.

The message sent to the eNB2 by the eNB1 may further contain a cell identity of a cell (a destination cell) located in the eNB2. For a process of automatically adjusting the mobility parameter between different RATs, if the cell located in the eNB2 is a LTE cell, the message further contains a TAI of the cell located in the eNB2. If the cell located in the eNB2 is a UMTS cell, the message further contains a LAI and RAC of the cell located in the eNB2, and may further contain a RNC ID of the cell located in the eNB2.

In block 302, the eNB2 sends a response message to the eNB1.

eNB2 decides whether to adjust the mobility parameter in the cell of eNB2 according to the adjustment in the cell of eNB1. According to the relative adjustment value of the threshold of the cell located in the eNB1, the eNB2 adjusts the mobility parameter of the cell located in the eNB2, where the mobility parameter is used for handing over to the frequency of the cell located in the eNB1.

If the eNB2 receives frequency information from the eNB1, the eNB2 adjusts the mobility parameters of all cells located in the eNB2 and working on the frequency, where the mobility parameters are used for handing over to the frequency of the source cell.

Or, if the eNB2 receives the cell identity of the cell located in the eNB2 from the eNB1, the eNB2 adjusts the mobility parameter of the cell located in eNB2 for handing over to the frequency of the source cell in eNB1. Or, the eNB2 adjusts the mobility parameters of all cells located in the eNB2 and working on the frequency according to the frequency of of the cell located in eNB2, towards the frequency of the cell located in the eNB1.

It should be noted that, if the eNB1 adjusts the handover parameter for handing over UE from the source cell to a certain frequency or another radio access system, the eNB1 sends a mobility change request message to all neighbor eNBs working on the frequency or the radio access. The contents contained in the mobility change request message are the same as those described in block 301 and are not illustrated herein. That is, the eNB1 sends the message described in block 301 to multiple neighbor eNBs working on the same frequency. Or, the eNB1 sends the message described in block 301 to multiple adjacent eNBs of the destination access system.

The eNBs receiving the message send a response message to the eNB1 respectively. The operations of the eNBs receiving the message and the contents contained in the response message are the same as those described in block 302 and are not illustrated herein.

And thus, the flowchart of the first method of automatically adjusting the mobility parameter according to the present invention terminates.

Figure 4:
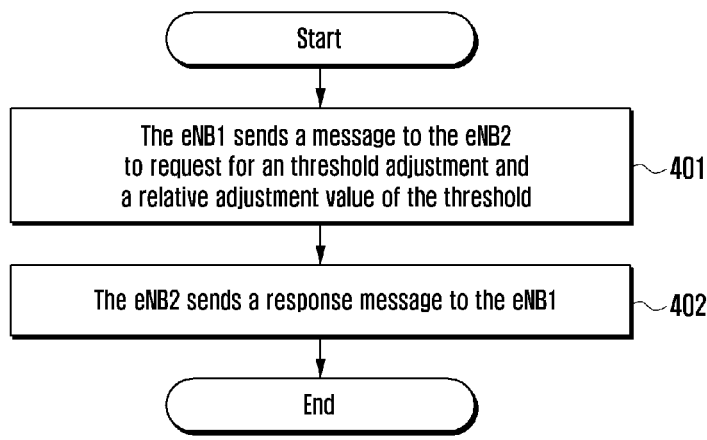
FIG. 4 is a schematic flowchart illustrating a second method of automatically adjusting a mobility parameter according to the present invention.

FIG. 4 is a schematic flowchart illustrating a second method of automatically adjusting a mobility parameter according to the present invention. As shown in FIG. 4, the method includes following blocks.

In block 401, the eNB1 sends a message to the eNB2 to request the eNB2 to adjust the mobility parameter of the cell located in the eNB2. The message contains a threshold requested to be adjusted and a relative adjustment value of the threshold, and may further contain a threshold of the mobility parameter adjusted in the cell located in the eNB1 and a relative adjustment value of the threshold in eNB1.

The threshold of the mobility parameter includes:
a threshold of the smallest quality level of destination frequency, and/or
a threshold of the largest quality level of source cell, and/or
a threshold of the smallest quality level of destination radio access system, and/or
a threshold of the largest quality level of source radio access system.

The message sent to the eNB2 by the eNB1 further contains a cell identity of the cell located in the eNB2. If the cell located in the eNB2 is a LTE cell, the message further contains a TAI of the cell located in the eNB2. If the cell located in the eNB2 is a UMTS cell, the message further contains a LAI and RAC of the cell located in the eNB2, and may further contain a RNC ID of the cell located in the eNB2.

The message sent to the eNB2 by the eNB1 further contains information of destination frequency to which the cell located in the eNB2 is to be adjusted.

The message sent to the eNB2 by the eNB1 may further contain a cell identity of the cell located in the eNB1. If the cell located in the eNB1 is a LTE cell, the message further contains a TAI of the cell located in the eNB1. If the cell located in the eNB1 is a UMTS cell, the message further contains a LAI and RAC of the cell located in the eNB1, and may further contain a RNC ID of the cell located in the eNB1.

In block 402, the eNB2 sends a response message to the eNB1.

The eNB2 may adjusts the mobility parameter of the cell located in the eNB2 to the frequency of the cell located in the eNB1 according to the request of the eNB1, where the mobility parameter is used for deciding handover to the frequency of the cell located in the eNB1.

The eNB2 decides whether to adjust the handover parameter for handing UE from the cell located in the eNB2 over to the destination frequency or another radio access system.

It should be noted that, the method may further include that, the eNB2 sends an adjustment notification to eNBs which control the neighboring cells of the cell in eNB2 and working on the destination frequency.

It should be noted that, the adjustment notification contains information of destination frequency to which the mobility parameter is adjusted, and/or a cell identity of the destination cell or a cell identity list.

And thus, the flowchart of the second method of automatically adjusting the mobility parameter according to the present invention terminates.

The forgoing illustrates two methods of the present invention in detail. The above methods are illustrated in detail hereinafter with reference examples.

Figure 5:
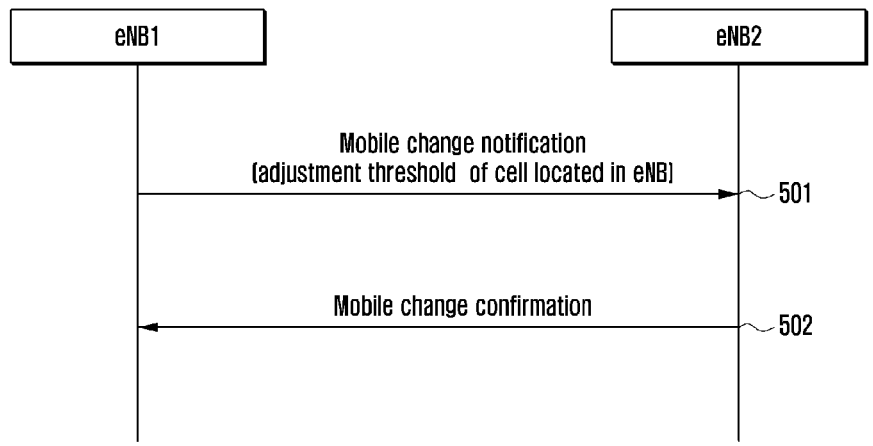
FIG. 5 is a schematic flowchart illustrating the first method of automatically adjusting the mobility parameter according to a first example of the present invention.

FIG. 5 is a schematic flowchart illustrating the first method of automatically adjusting the mobility parameter according to a first example of the present invention. This example may be applied to the automatic adjustment of mobile parameter when Mobile Load Balance (MLB) or Mobile Robustness self-Optimization (MRO) between different frequencies in the LTE system is needed. As shown in FIG. 5, the method includes following blocks.

In block 501, the eNB1 sends a mobile change notification message to the eNB2. The contents contained in the message are the same as those described in block 301, and are not illustrated herein.

In block 502, the eNB2 sends a mobile change confirmation message to the eNB1. The contents contained in the message are the same as those described in block 302, and are not illustrated herein.

And thus, the flowchart of the first method of automatically adjusting the mobility parameter according to the first example of the present invention terminates.

Figure 6:
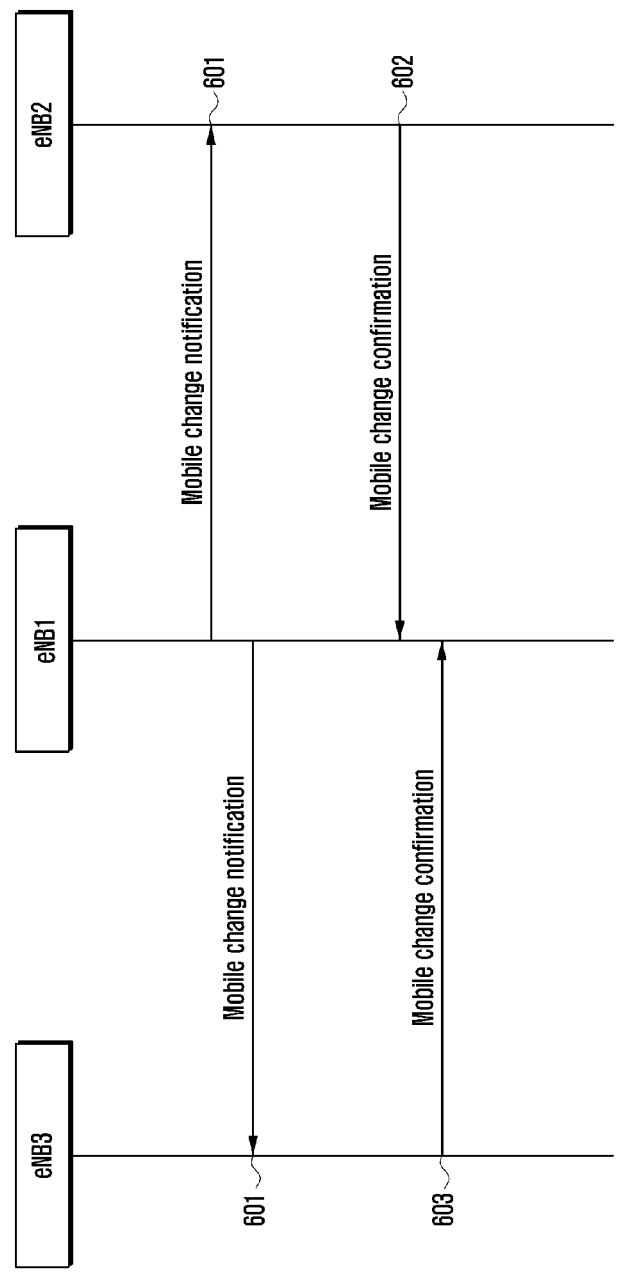
FIG. 6 is a schematic flowchart illustrating the first method of automatically adjusting the mobility parameter according to a second example of the present invention.

FIG. 6 is a schematic flowchart illustrating the first method of automatically adjusting the mobility parameter according to a second example of the present invention. This example may be applied to the automatic adjustment of mobility parameter when MLB or MRO between different frequencies in the LTE system are needed. As shown in FIG. 6, the method includes following blocks.

In block 601, the eNB1 adjusts the mobility parameter of a certain cell (a source cell) located in the eNB1 for handing over to a destination frequency. The eNB1 sends a mobile change notification message to eNBs which control neighbor cells of the source cell and working on the destination frequency, for example, the eNB2 and an eNB3. The contents contained in the message are the same as those described in block 301, and are not illustrated herein.

In block 602, the eNB2 sends a mobile change confirmation message to the eNB1. The contents contained in the message are the same as those described in block 302, and are not illustrated herein.

In block 603, the eNB3 sends a mobile change confirmation message to the eNB1. The contents contained in the message are the same as those described in block 302, and are not illustrated herein.

And thus, the flowchart of the first method of automatically adjusting the mobility parameter according to the second example of the present invention terminates.

Figure 7:
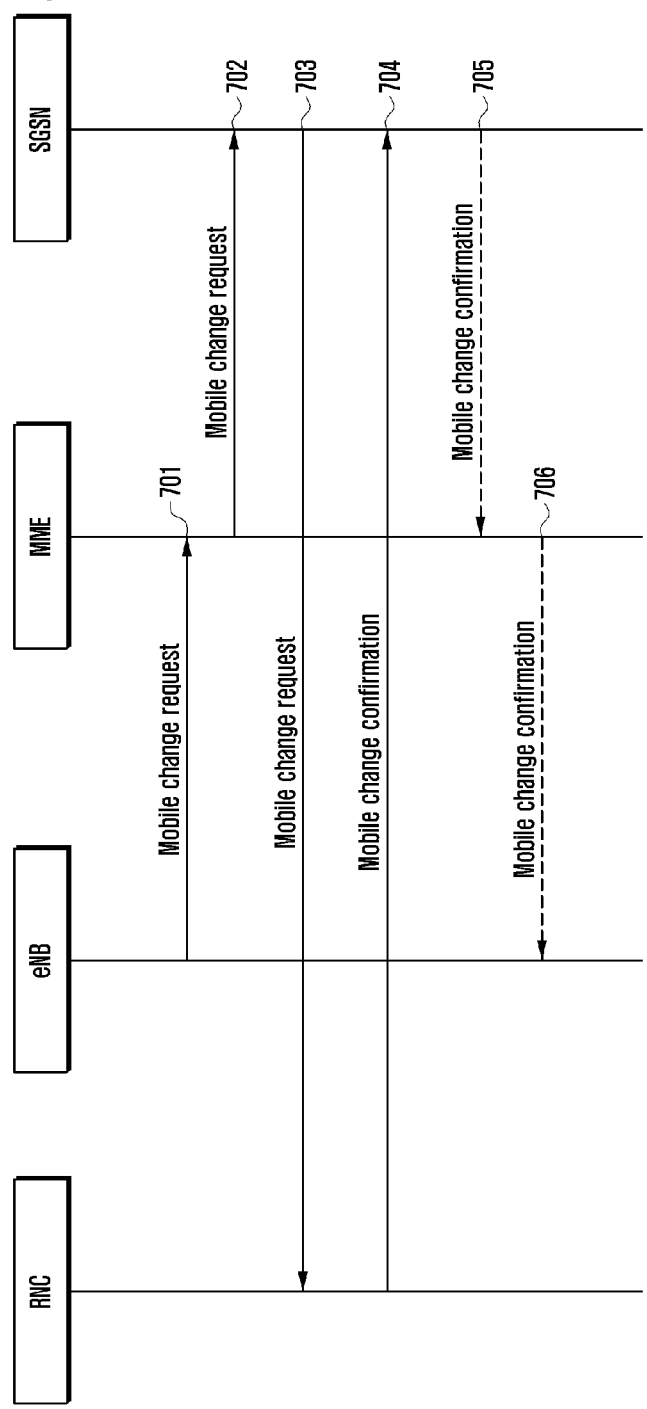
FIG. 7 is a schematic flowchart illustrating the first method of automatically adjusting the mobility parameter according to a third example of the present invention.

FIG. 7 is a schematic flowchart illustrating the first method of automatically adjusting the mobility parameter according to a third example of the present invention. The example may be applied to the automatic adjustment of mobility parameter when MLB or MRO between the LTE and 3G is needed. As shown in FIG. 7, the method includes following blocks.

In block 701, an eNB sends a mobile change request message to a MME. The message contains a threshold of mobility parameter for handover UE from the cell located in the eNB to a destination frequency and a relative adjustment value of the threshold. The threshold of the mobility parameter includes:

a threshold of the smallest quality level of destination frequency, and/or
 a threshold of the largest quality level of source cell, and/or
 a threshold of the smallest quality level of destination radio access system, and/or
 a threshold of the largest quality level of source radio access system.

The message may contain a cell identity of a cell (a source cell) located in the eNB. The message may further contain a TAI of the source cell.

The message may further contain information to which frequency the mobility parameter for handing over UE is adjusted by the eNB.

The message may further contain a cell identity of a cell (a destination cell) controlled by a RNC. The message further contains a LAI and RAC of a cell located in the RNC, and may further contain a RNC ID of the cell located in the RNC In block 702, the MME forwards the received mobile change request message to a destination Service GPRS Supporting Node (SGSN). The MME finds the SGSN according to the LAI and RAC contained in the received message.

In block 703, the SGSN sends the received mobile change request message to the RNC. The SGSN finds the RNC according to the RNC ID contained in the received message.

In the method of the present invention, a process that the RNC sends a confirmation message to the source eNB through the core network is not essential. That is, the method of the present invention includes two mechanisms in which the RNC sends the confirm message and does not send the confirmation message respectively.

In block 704, the RNC sends a mobile change confirm message to the SGSN.

According to the relative adjustment value of the threshold of the source cell, the RNC adjusts the mobile parameter of the cell controlled by the RNC, where the mobility parameter is used for handing over UE from the cell controlled by the RNC to the frequency of the cell located in the eNB.

If the RNC receives frequency information from the eNB, the RNC adjusts the mobile parameter of all cells controlled by the RNC and working on the frequency, where the mobility parameters are used for handing over UE from the cell controlled by the RNC to the frequency of the source cell.

Or, if the RNC receives the cell identity of the cell controlled by the RNC from the eNB, the RNC adjusts the mobility parameter of the cell for handing over UE to the frequency of the source cell. Or, the RNC adjusts the mobility parameters of all cells controlled by the RNC and working on the frequency, according to the frequency of the destination cell, where the mobile parameters are used for handing over UE from the frequency of the destination cell to the frequency of the cell located in the eNB.

It should be noted that, if the eNB adjusts the handover parameter for handing over UE from the source cell to a certain frequency or another radio access system, the eNB sends a mobile change request message to eNBs which control the neighbor cells of the source cell and working on the frequency or the radio access system. The contents contained in the mobile change request message are the same as those described in block 701 and are not illustrated herein. That is, the eNB sends the message described in block 701 to multiple adjacent eNBs working on the same frequency. Or, the eNB sends the message described in block 701 to multiple adjacent eNBs of the destination access system.

The eNBs receiving the message send a response message to the eNB respectively. The operations of the eNBs receiving the message and the contents contained in the response message are the same as those described in block 702 and are not illustrated herein.

In block 705, the SGSN sends the received mobile change confirmation message to the MME.

In block 706, the MME sends the mobile change confirmation message to the eNB.

And thus, the flowchart of the first method of automatically adjusting the mobile parameter according to the third example of the present invention terminates.

Figure 8:
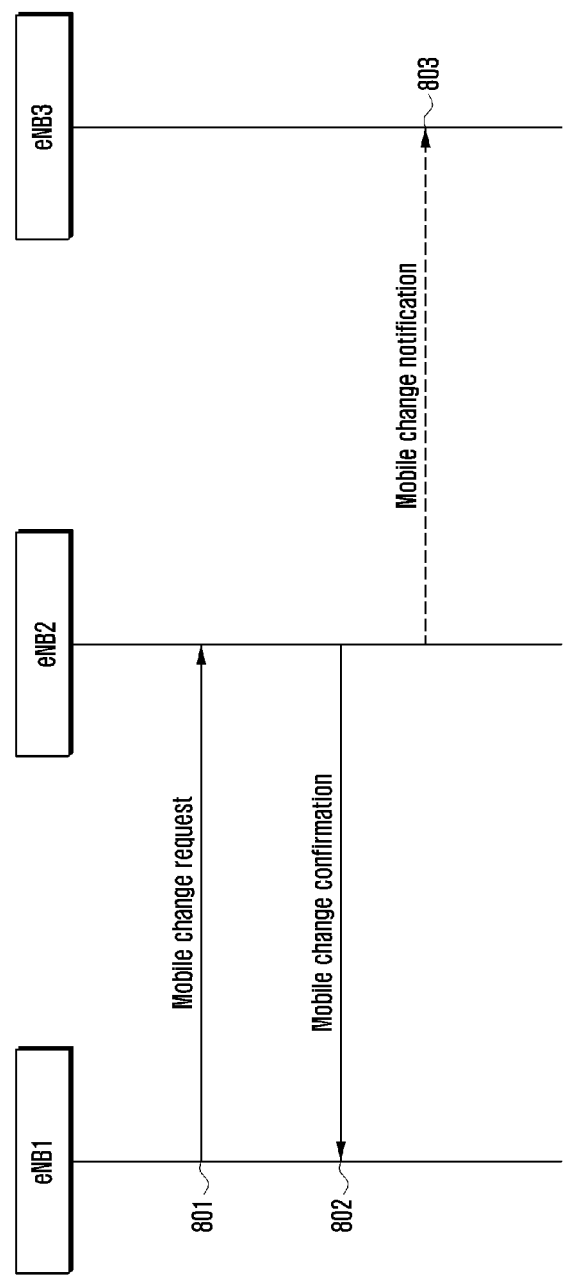
FIG. 8 is a schematic flowchart illustrating the second method of automatically adjusting the mobility parameter according to a first example of the present invention.

FIG. 8 is a schematic flowchart illustrating the second method of automatically adjusting the mobility parameter according to a first example of the present invention. The example may be applied to the automatic adjustment of mobility parameter when MLB or MRO between different frequencies in the LTE system is needed. As shown in FIG. 8, the method includes following blocks.

In block 801, the eNB1 sends a mobile change request message to the eNB2. The contents contained the message are the same as those described in block 401 and are not illustrated herein.

In block 802, the eNB2 sends a mobile change confirmation message the eNB1. The eNB2 decides whether to adjust the handover parameter for handover UE from the cell located in the eNB2 to the destination frequency (the frequency of the source cell). The eNB2 may adjust the handover trigger from the cell located in the eNB2 to the frequency of the cell located in the eNB1 according to the request of the eNB1.

In block 803, the eNB2 sends a mobile change notification message to the eNB3. After the eNB2 adjusts the handover trigger from the cell located in the eNB2 to the frequency of the cell located in the eNB1 (destination frequency), the eNB2 notifies neighbor cells working on the destination frequency that the mobile parameter from the cell located in the eNB2 to the destination frequency is adjusted. The mobile change notification message contains the information of destination frequency, and/or a cell identity of the destination cell or a cell identity list. The message further obtains a threshold adjusted and a relative adjustment value of the threshold.

And thus, the flowchart of the second method of automatically adjusting the mobility parameter according to the first example of the present invention terminates.

Figure 9:
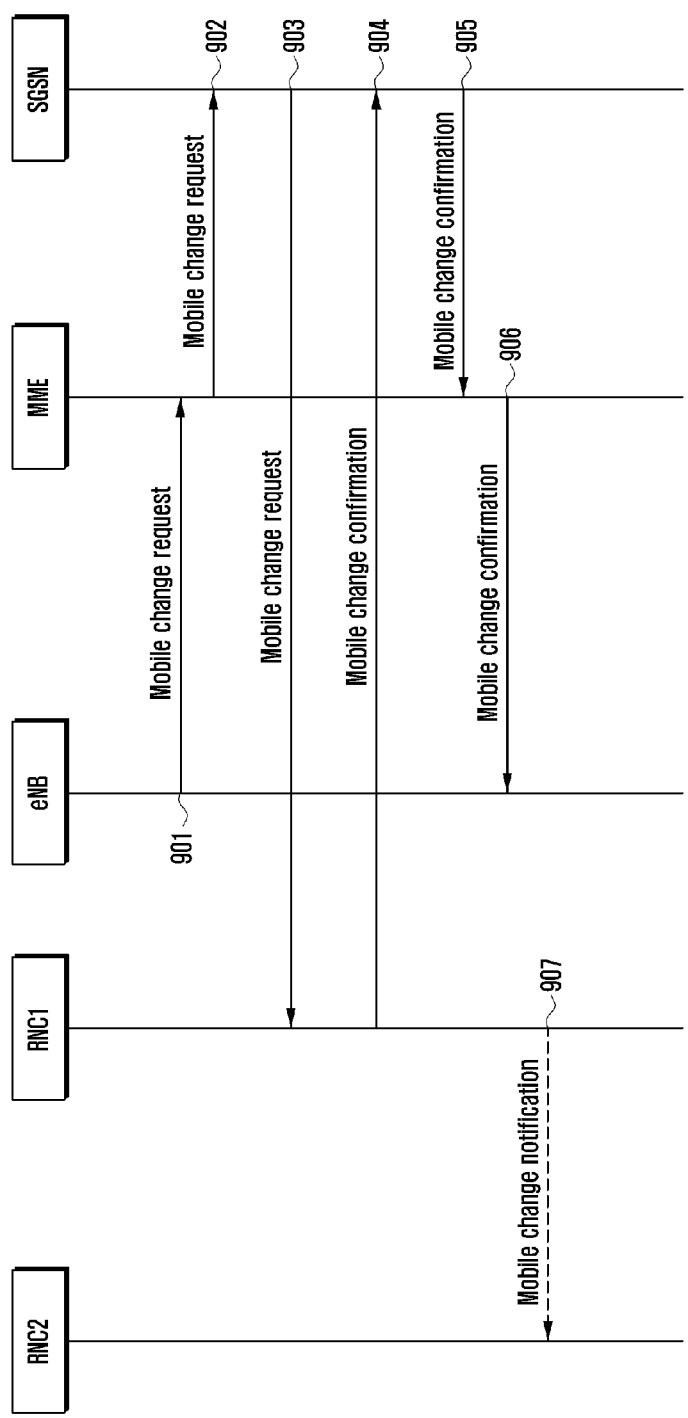
FIG. 9 is a schematic flowchart illustrating the second method of automatically adjusting the mobility parameter according to a second example of the present invention.

FIG. 9 is a schematic flowchart illustrating the second method of automatically adjusting the mobility parameter according to a second example of the present invention. The example may be applied to the automatic adjustment of mobility parameter when MLB or MRO between the LTE and 3G is needed. As shown in FIG. 9, the method includes following blocks.

In block 901, the eNB sends a mobile change request message to the MME. The message contains a threshold requested to be adjusted in the cell controlled by the RNC and a relative adjustment value of the threshold, and may further contain a threshold adjusted in the cell located in the eNB and a relative adjustment value of the threshold. The threshold of the mobility parameter includes:
  a threshold of the smallest quality level of destination frequency, and/or
  a threshold of the largest quality level of source cell, and/or
  a threshold of the smallest quality level of destination radio access system, and/or
  a threshold of the largest quality level of source radio access system.

The message may further contain a cell identity of the cell (a source cell) located in the eNB. The message may further contain a TAI of the source cell.

The message may further contain information to which frequency that the eNB requests the RNC to adjust the mobility parameter for handing over UE.

The message may further contain a cell identity of the cell (a destination cell) controlled by the RNC. The message further contains the LAI and RAC of a cell located in the RNC, and may further contain the RNC ID of the cell located in the RNC.

In block 902, the MME forwards the received mobile change request message to a destination SGSN. The MME finds the SGSN according to the LAI and RAC contained in the received message.

In block 903, the SGSN sends the received mobile change request message to the RNC1. The SGSN finds the RNC1 according to the RNC ID contained in the received message.

In the method of the present invention, a process that the RNC sends a confirmation message to the source eNB through the core network is not essential. That is, the method of the present invention includes two mechanisms in which the RNC sends the confirm message and does not send the confirmation message respectively.

In block 904, the RNC1 sends a mobile change confirm message to the SGSN.

According to the relative adjustment value of the threshold of the source cell, the RNC1 adjusts the mobility parameter of the cell controlled by the RNC1, where the mobility parameter is used for handing over UE from the cell controlled by the RNC1 to the frequency of the cell located in the eNB.

If the RNC1 receives frequency information from the eNB, the RNC1 adjusts the mobility parameter of all cells working on the frequency and controlled by the RNC1, where the mobility parameters are used for handing over UE to the frequency of the source cell.

Or, if the RNC1 receives the cell identity of the cell controlled by the RNC1 from the eNB, the RNC1 adjusts the mobility parameter of the cell for handing over to the frequency of the source cell in eNB. Or, the RNC1 adjusts the mobility parameters of all cells controlled by the RNC1 and working on the frequency, according to the frequency of the cell controlled by the RNC1, where the mobile parameters are used for handing over UE to the frequency of the cell located in the eNB.

It should be noted that, if the eNB adjusts the handover parameter for handing over UE from the source cell to a certain frequency or another radio access system, the eNB sends a mobile change request message to eNBs which control neighbor cell of the source cell and working on the frequency or the radio access system. The contents contained in the mobile change request message are the same as those described in block 901 and are not illustrated herein. That is, the eNB sends the message described in block 901 to multiple adjacent eNBs working on the same frequency. Or, the eNB sends the message described in block 901 to multiple adjacent eNBs of the destination access system.

The eNBs receiving the message send a response message to the eNB respectively. The operations of the eNBs receiving the message and the contents contained in the response message are the same as those described in block 602 and are not illustrated herein.

In block 905, the SGSN sends the received mobile change confirmation message to the MME.

In block 906, the MME sends the mobile change confirmation message to the eNB.

Block 907 is the same as block 803 and is not illustrated herein. Block 907 is not essential in this example.

And thus, the flowchart of the second method of automatically adjusting the mobile parameter according to the second example of the present invention ends.

Figure 10:
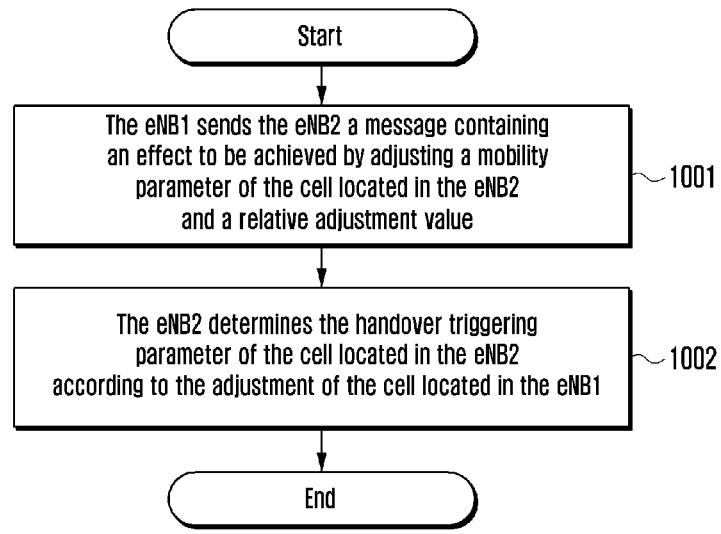
FIG. 10 is a schematic flowchart illustrating a third method of automatically adjusting a mobility parameter according to the present invention.

FIG. 10 is a schematic flowchart illustrating a third method of automatically adjusting a mobility parameter according to the present invention. As shown in FIG. 10, the method includes following blocks.

In block 1001, the eNB1 sends the eNB2 a message containing an effect to be achieved by adjusting a mobility parameter of the cell located in the eNB2 and a relative adjustment value. The message sent to the eNB2 by the eNB1 contains the cell identity of the cell (a source cell) located in the eNB1. The message sent to the eNB2 by the eNB1 may further contain the cell identity of the cell (the destination cell) located in the eNB2.

The effect to be achieved by adjusting the mobility parameter includes:
  handing over to the destination frequency earlier, or
  handing over to the destination frequency later.

The message sent to the eNB2 by the eNB1 further contains information to which frequency that the mobility parameter for handing over is adjusted by the cell located in the eNB1.

In block 1002, the eNB2 determines the handover triggering parameter of the cell located in the eNB2 according to the adjustment of the cell located in the eNB1.

The eNB2 adjusts all cells located in the eNB2 and working on the frequency.

The eNB2 sends a response message to the eNB1.

And thus, the flowchart of the third method of automatically adjusting the mobility parameter according to the example of the present invention terminates.

Figure 11:
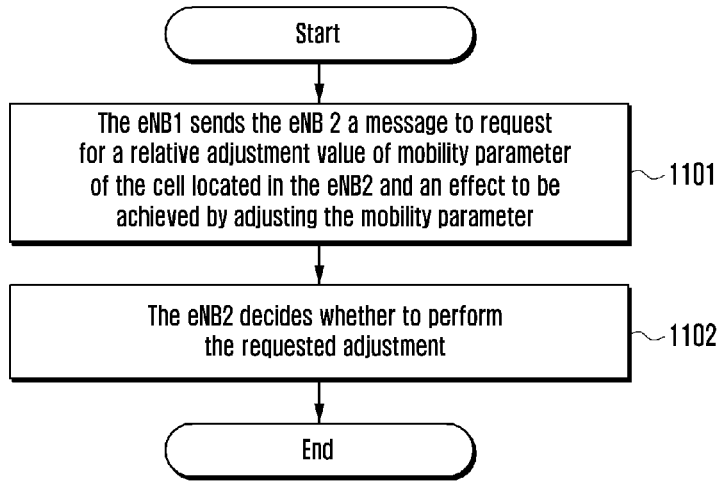
FIG. 11 is a schematic flowchart illustrating a fourth method of automatically adjusting a mobility parameter according to the present invention.

FIG. 11 is a schematic flowchart illustrating a fourth method of automatically adjusting a mobility parameter according to the present invention. As shown in FIG. 11, the method includes following blocks.

In block 1101, the eNB1 sends the eNB2 a message to request for a relative adjustment value of mobility parameter of the cell located in the eNB2 and an effect to be achieved by adjusting the mobility parameter. The message sent to the eNB2 by the eNB1 contains the cell identity of the cell (a source cell) located in the eNB1 and/or the frequency of the cell located in the eNB1.

The effect to be achieved by adjusting the mobility parameter includes:

handing over to the destination frequency earlier, or handing over to the destination frequency later.

The message sent to the eNB2 by the eNB1 may further contain the cell identity of the cell (a destination cell) located in the eNB2.

The message sent to the eNB2 by the eNB1 further contains information about that the cell located in the eNB1 adjusts the mobility parameter for handing over to the destination frequency.

The message sent to the eNB2 by the eNB1 further contains information to which frequency that the mobility parameter for handing over UE is adjusted by the cell located in the eNB1.

The message sent to the eNB2 by the eNB1 further contains the effect to be achieved by adjusting the mobility parameter.

The effect to be achieved by adjusting the mobility parameter includes:

handing over to the destination frequency earlier, or handing over to the destination frequency later.

In block 1102, the eNB2 decides whether to perform the requested adjustment.

The eNB2 adjusts the mobility parameters of all cells located in the eNB2 and working on the frequency (the frequency of the destination cell or the indicated frequency in the message in step 1101).

The eNB2 sends a response message to the eNB1.

And thus, the flowchart of the fourth method of automatically adjusting the mobility parameter according to the example of the present invention terminates.

As can be seen from the above solution, in the method of automatically adjusting a mobility parameter, through sending the peer eNB the message containing different handover thresholds, the relative adjustment value corresponding to each threshold and/or the information of adjusted destination frequency, the peer eNB can learn that which threshold is adjusted by the source eNB, so as to adjust the corresponding parameter. In this way, the accuracy and efficiency of automatic adjustment of the mobility parameter are improved, and the destination eNB can adjust the mobility parameters of all cells of working on the same frequency, so as to guarantee that the adjustment of the mobility parameter for handing over from the source cell to the destination cell working on the same frequency has no negative influence. By the method of the present invention, the automatic adjustment of mobility parameter between different frequencies or different access systems becomes available and can be supported in the case of the self-optimization of mobility load balance and the self-optimization of mobile robustness, so as to improve the performance of mobile communication system.

The above examples illustrate the object, technical solution and merits of the present invention in detail. It should be noted that, the foregoing is only preferred examples of the present application and is not used to limit the protection scope of the present application. Any modification, equivalent substitution and improvement without departing from the spirit and principle of the present application are within the protection scope of the present application.

The invention claimed is:

1. A method of automatically adjusting a mobile parameter, the method comprising:

receiving, by an evolved Node B (eNB) 2, a message from an eNB1 to request the eNB2 to adjust a mobility parameter of a cell of the eNB2, wherein the message contains an eNB2 threshold requested to be adjusted and a relative adjustment value corresponding to the eNB2 threshold and an eNB 1 threshold of a mobile parameter adjusted in a cell of the eNB1 and a relative adjustment value corresponding to the eNB 1 threshold; and sending, by the eNB2, a response message to the eNB1.

2. The method of claim 1, wherein the eNB 1 threshold of the mobility parameter comprises at least one of:

a threshold of the smallest quality level of destination frequency, a threshold of the largest quality level of source cell, a threshold of the smallest quality level of destination radio access system, or a threshold of the largest quality level of source radio access system.

3. The method of claim 1, further comprising:

adjusting, by the eNB2, the mobility parameter of the cell of the eNB2 to a frequency of the cell of the eNB1 according to the request of the eNB 1, wherein the mobility parameter is used for deciding handing over to a frequency of the cell of the eNB1.

4. The method of claim 1, wherein the message received by the eNB2 from the eNB1 further contains information about to which frequency the mobility parameter for handing over is adjusted by eNB1.

5. The method of claim 1, wherein the message received by the eNB2 from the eNB1 further contains a cell identity of the cell of the eNB2.

6. The method of claim 1, wherein the message received by the eNB2 from the eNB1 further contains a cell identity of the cell of the eNB1.

7. The method of claim 1, further comprising:

requesting, by the eNB1, to adjust a handover parameter for handing over UE to a frequency or another radio access system from the cell of eNB2, determining, by the eNB2, the adjustment of the handover parameter for handing over UE to the frequency or the other radio access system from the cell of eNB2, and sending, by the eNB2, a response message to the eNB1.

8. The method of claim 7, further comprising:

sending, by the eNB2, an adjustment notification to all neighbor eNBs controlling cells operating on the frequency.

9. The method of claim 8, further comprising:

the adjustment notification contains information of the frequency to which the mobility parameter is adjusted, a cell identity of a destination cell, or a cell identity list to which the mobility parameter is adjusted.

10. A method of automatically adjusting a mobility parameter, the method comprising:

receiving, by an evolved Node B (eNB) 2 from an eNB 1, a message to request for a relative adjustment value and an effect to be achieved by adjusting a mobility parameter of a cell of the eNB2; and sending, by the eNB2, a response message to the eNB1, wherein the message contains an eNB 2 threshold requested to be adjusted and a relative adjustment value corresponding to the eNB 2 threshold and an eNB 1 threshold of a mobile parameter adjusted in a cell of the eNB1 and a relative adjustment value corresponding to the eNB 1 threshold.

11. The method of claim 10, wherein the message received by the eNB2 by from the eNB1 contains a cell identity of a cell of the eNB1, or a frequency of the cell of the eNB1, wherein the cell of the eNB1 is a source cell.

12. The method of claim 10, wherein the effect to be achieved by adjusting the mobility parameter comprises:
   handing over to a destination frequency earlier, or
   handing over to the destination frequency later.

13. The method of claim 10, wherein the message received by the eNB2 from the eNB1 further contains a cell identity of the cell of the eNB2, wherein the cell of the eNB2 is a destination cell.

14. The method of claim 10, wherein the message received by the eNB2 from the eNB1 further contains information about that the cell of the eNB1 adjusts the mobility parameter for handing over to a destination frequency.

15. The method of claim 14, wherein the message received by the eNB2 from the eNB1 further contains information about that the mobility parameter for handing over to which frequency is adjusted by the cell of the eNB1.

16. The method of claim 14, wherein the message received by the eNB2 from the eNB1 further contains the effect to be achieved by adjusting the mobility parameter of the cell of the eNB1.

17. The method of claim 16, wherein the effect to be achieved by adjusting the mobility parameter comprises:
   handing over to the destination frequency earlier, or
   handing over to the destination frequency later.

18. The method of claim 15, wherein the eNB2 adjusts mobility parameters of all cells of the eNB2 and operating on the frequency.

* * * * *